United States Patent [19]

Mouritsen et al.

[11] 4,214,441
[45] Jul. 29, 1980

[54] INFRARED SUPPRESSOR DEVICE

[75] Inventors: Thorvald E. Mouritsen; William E. Simpkin, both of Dallas, Tex.

[73] Assignee: The United States of America as represented by the Secretary of the Navy, Washington, D.C.

[21] Appl. No.: 941,702

[22] Filed: Sep. 12, 1978

[51] Int. Cl.³ .......................... F02K 3/04; B64D 33/04
[52] U.S. Cl. ........................................ 60/262; 60/264; 239/127.3; 239/265.17
[58] Field of Search .................... 60/262, 264, 39.23, 60/39.72 R, 271; 415/DIG. 1; 138/39; 239/127.3, 265.17

[56] References Cited

U.S. PATENT DOCUMENTS

| | | | |
|---|---|---|---|
| 3,059,423 | 10/1962 | Berlyn | 60/324 |
| 3,508,561 | 4/1970 | Cornish | 60/271 |
| 3,659,418 | 5/1972 | Poucher | 138/39 |
| 3,970,252 | 7/1976 | Smale | 60/271 |
| 4,044,555 | 8/1977 | McLoughlin | 60/271 |

FOREIGN PATENT DOCUMENTS 1030483  6/1953  France ............................... 415/DIG. 1

Primary Examiner—Douglas Hart
Attorney, Agent, or Firm—R. S. Sciascia; Paul S. Collignon

[57] ABSTRACT

An air-cooled contoured plug fitted within the engine tailpipe to physically block any direct view to the turbine section. A vortex cavity is provided around the plug just aft of the plug maximum diameter in order to reduce the length of the cone-shaped plug. The trapped vortex reenergizes the boundary layer built up along the cone surface and allows the flow of hot gases to turn the corner without separating.

7 Claims, 3 Drawing Figures

INFRARED SUPPRESSOR DEVICE

BACKGROUND OF THE INVENTION

The present invention relates to an infrared suppressor device for a jet engine, and more particularly to a suppressor device which will mask the radiation from an engine exhaust so as to avoid detection by heat sensitive detector.

A power source for an aircraft generates heat which produces hot metal surfaces and also a stream of heated exhaust gas. These sources of infrared radiation, i.e., hot metal surfaces and a heated stream of exhaust gas, provide a target source for heat-seeking missiles which lock on the target source and are, thereby, led directly to the power source for the aircraft.

In providing an aircraft whose power source is not easily discernible by a heat-seeking missile, a first step would be to insulate the surfaces of the aircraft engine. The insulation of the aircraft engine surface is, however, only a first step in reducing infrared radiation from the aircraft power source. Even when the aircraft engine is well insulated, hot metal surfaces within the engine interior may still be viewed by a heat-seeking missile through an opening for exhaust gases positioned adjacent the hot interior surfaces. Thus, in addition to insulating the exterior surfaces of the engine, it is also desirable to, in some way, block the metal surfaces within the engine interior from view through the exhaust gas opening while still providing an opening for discharge of the exhaust gases.

One method for hiding hot engine parts is to provide a contoured plug which is placed in the exhaust pipe of a turbojet engine. One such device is shown and described in U.S. Pat. No. 3,693,880, entitled, "Infrared Suppressor Means", which issued to Edward F. Versaw, on Sept. 26, 1972. The plug is comprised of two half sections which are separated by a honeycomb heat shield and the aft half is air-cooled. The plug is large enough in diameter to hide from view hot engine parts forward of the plug, such as the turbine wheel, exhaust cone, flameholders, and the exhaust pipe wall.

SUMMARY OF THE INVENTION

The present invention relates to a device for reducing the infrared signature of an aircraft engine. A short cone-shaped centerbody or plug is fitted within the engine tailpipe and is of sufficient diameter to hide hot engine parts. Hot engine gases pass over the exterior of the plug and are mixed with cooler fan air. Cool fan air is also blown inside the plug and exists through slots in the conical surface. An annular slot forming a vortex cavity is provided around the cone-shaped plug just aft of the plug maximum diameter and high pressure bleed air is blown through the annular slot to make up the boundary layer velocity deficiency and to overcome the wall friction of the vortex in the cavity.

The trapped vortex reenergizes the boundary layer built up along the conical surface and allows the flow to turn the corner without separating. In a general application, only enough high pressure bleed air need be blown through the annular slot to make up the boundary layer velocity deficiency and to overcome the wall friction of the vortex in the cavity. However, additional low pressure fan bypass cooling air may be provided through slots located between the vortex cavity and the cone apex.

It is therefore a general object of the present invention to provide an infrared suppression device which will block any direct line of sight into the core engine.

Another object of the present invention is to provide improved cooling of a cone-shaped plug which physically blocks any direct view to the turbine section of an aircraft engine.

Other objects, advantages and novel features of the present invention will become apparent from the following detailed description of the invention when considered in conjunction with the accompanying drawing.

DESCRIPTION OF THE PREFERRED EMBODIMENT

Figure 1:
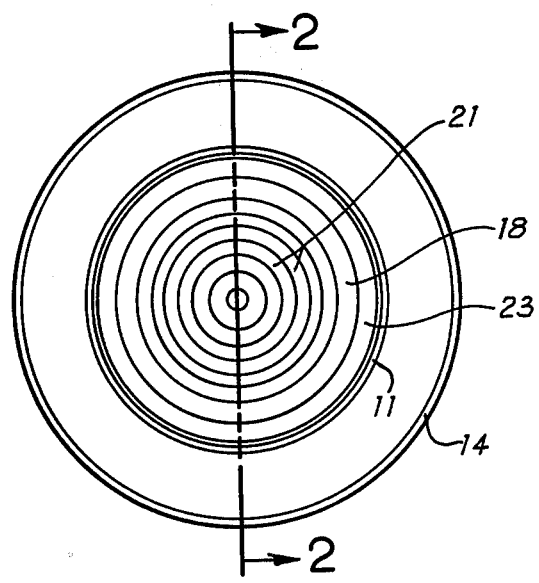
FIG. 1 is an end view looking into an engine tailpipe.
Figure 2:
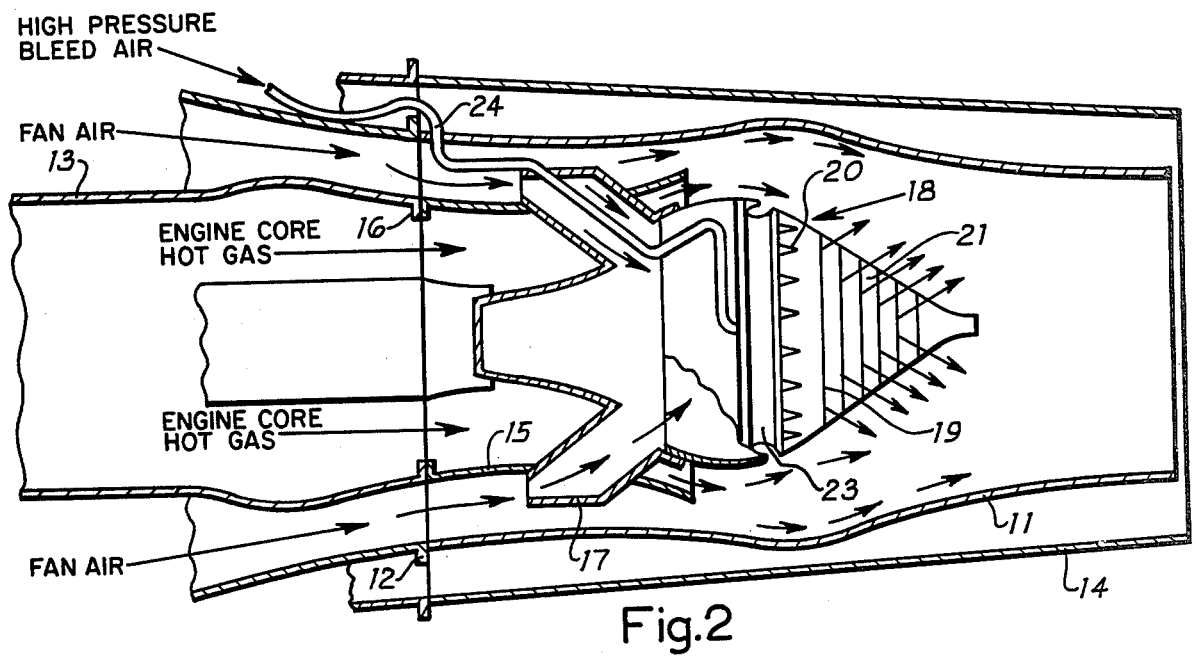
FIG. 2 is a partial sectional view taken on line 2—2 of FIG. 1.
Figure 3:
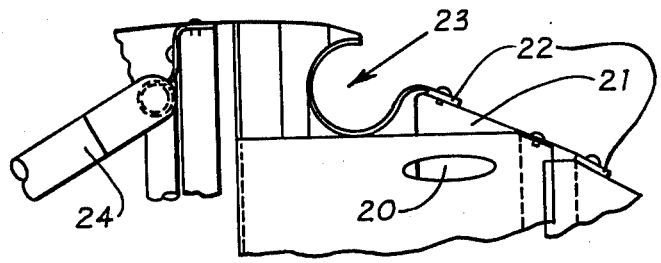
FIG. 3 is a partial sectional view showing construction of a vortex cavity.

Referring now to the drawing, there is shown a tailpipe 11 which is attached, as by bolting, to an engine flange 12 which is part of an aircraft engine 13. An aircraft tail cone 14 is shown surrounding tailpipe 11. A splitter 15 is attached, as by bolting, to an engine attached flange 16 and splitter 15 is provided with a plurality of ducts 17 which divert cool fan air from a fan stream into a cone-shaped plug 18. By way of example, eight ducts 17 might be equally spaced about the periphery of splitter 15 so that sufficient fan air is withdrawn to cool plug 18. As shown in FIGS. 1 and 2 of the drawing, the hot engine gases flow over the outer surface of plug 18 and cooler fan air is ducted inside plug 18 and exists through slots 19 in the plug's aft-facing surface. Starting with the forward end of plug 18, which is the end nearer engine 13, plug 18 increases in diameter until it reaches a maximum diameter and then plug 18 tapers inwardly to form a conical surface. As best shown in FIG. 3 of the drawing, the conical surface of plug 18 is built up of a series of concentric rings 21 which, by way of example, are riveted together and spaced apart by spacers 22 in order to provide slots 19 and allow airflow between rings 21. Additionally, a plurality of holes 20 are provided to allow passage of fan air from plug 18.

Referring now to FIGS. 2 and 3 of the drawing, an annular vortex cavity 23 is located just aft of the maximum diameter of plug 18 and high pressure bleed air is supplied to cavity 23 through one or more conduits 24. Cavity 23, when supplied by high pressure bleed air provides a trapped vortex which reenergizes the boundary layer built up along the cone surface of plug 18 and allows the flow of hot engine gases to turn the corner without separating.

In operation, the maximum diameter of plug 18 is sufficiently large such that, when positioned in an aircraft engine tailpipe 11, plug 18 will physically block any direct view of the turbine section of the aircraft engine. The engine core gases which pass into tailpipe 11 will flow around and heat plug 18. Low temperature engine fan air is directed by ducts 17 to pass into plug 18 to cool plug 18 and this air will exit plug 18 through slots 19 and hole 20. High pressure bleed air is directed by one or more conduits 24 into the annular vortex cavity 23. The trapped vortex, which is positioned at about the midpoint of plug 18, introduces sufficient energy into the boundary layer to cause it to remain attached to a short plug with a steep angle.

It can thus be seen that the present invention provides an improved suppression device for reducing the infrared signature of an aircraft engine.

Obviously many modifications and variations of the present invention are possible in the light of the above teachings. It is therefore to be understood that the invention may be practiced otherwise than as specifically described.

We claim:

1. An infrared suppressor for the exhaust of an infrared radiation source comprising,
    a tailpipe for receiving hot exhaust gases from said infrared radiation source and low temperature fan air,
    a contoured plug fitted within said tailpipe and positioned to have said hot gases flow over the surface thereof, said contoured plug being sufficiently large to prevent direct viewing of said infrared radiation source,
    an annular vortex cavity on said contoured plug for reenergizing the boundary layer built up along the surface of said contoured plug for maintaining flow of said hot exhaust gases in contact with said contoured plug,
    means for supplying high pressure bleed air to said vortex cavity, and
    means for diverting a portion of said low temperature fan air inside said contoured plug.

2. An infrared suppressor for the exhaust of an infrared radiation source as set forth in claim 1 wherein said means for diverting a portion of said low temperature fan air inside said contoured plug comprises a splitter supporting the forward end of said contoured plug, said splitter having a plurality of ducts positioned in the stream of said low temperature fan air for directing air into the inside of said contoured plug.

3. An infrared suppressor for the exhaust of an infrared radiation source as set forth in claim 1 wherein said contoured plug has a forward section which tapers outwardly to a maximum diameter and an adjoining aft section which tapers inwardly.

4. An infrared suppressor for the exhaust of an infrared radiation source as set forth in claim 3 wherein said annular vortex cavity is provided in said aft section near said maximum diameter of said contoured plug.

5. An infrared suppressor for the exhaust of an infrared radiation source as set forth in claim 3 wherein said aft section is comprised of a plurality of concentric rings which are fastened together to form a conical section with adjacent rings being spaced apart to provide a slot through which air inside said contoured plug can pass.

6. An infrared suppressor for the exhaust of an infrared radiation source comprising,
    a tailpipe for receiving hot exhaust gases from said infrared radiation source and low temperature fan air,
    a contoured plug fitted within said tailpipe and positioned to have said hot gases flow over the surface thereof, said contoured plug being sufficiently large to prevent direct viewing of said infrared radiation source and having an aft section comprised of a plurality of concentric rings which are fastened together to form a conical section with adjacent rings being spaced apart to provide air slots in said conical section,
    an annular vortex cavity on said aft section of said contoured plug for reenergizing the boundary layer built up along the surface of said contoured plug for maintaining flow of said hot exhaust gases in contact with said contoured plug,
    means for supplying high pressure bleed air to said annular vortex cavity, and
    a splitter supporting the forward end of said contoured plug, said splitter having a plurality of ducts positioned in the stream of said low temperature fan air for directing air into the inside of said contoured plug and out through said air slots.

7. An infrared suppressor for the exhaust of an infrared radiation source as set forth in claim 6 wherein said annular vortex cavity is provided in said aft section near said maximum diameter of said contoured plug.

* * * * *